(12) United States Patent
Uozumi et al.

(10) Patent No.: US 7,810,753 B2
(45) Date of Patent: Oct. 12, 2010

(54) FILAMENT WINDING METHOD AND APPARATUS

(75) Inventors: Tadashi Uozumi, Kyoto (JP); Hiroki Takashima, Kyoto (JP); Motohiro Tanigawa, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 293 days.

(21) Appl. No.: 12/068,991

(22) Filed: Feb. 14, 2008

(65) Prior Publication Data

US 2008/0197229 A1 Aug. 21, 2008

(30) Foreign Application Priority Data

Feb. 15, 2007 (JP) .............................. 2007-034723

(51) Int. Cl.
*B21C 47/02* (2006.01)
(52) U.S. Cl. .................. 242/444; 242/438; 242/441
(58) Field of Classification Search ................ 254/437, 254/438, 438.1, 439.5, 441, 441.2, 444, 448
See application file for complete search history.

(56) References Cited

U.S. PATENT DOCUMENTS

| | | | | |
|---|---|---|---|---|
| 3,673,785 A | * | 7/1972 | Cullen et al. ............. | 242/441.2 |
| 4,028,164 A | * | 6/1977 | Montagut ................... | 156/173 |
| 4,077,828 A | * | 3/1978 | Strom ........................ | 156/429 |
| 4,251,036 A | * | 2/1981 | McLain ...................... | 242/444 |
| 4,288,267 A | * | 9/1981 | McLarty ..................... | 156/175 |
| 4,346,550 A | * | 8/1982 | Ferree ......................... | 57/10 |
| 4,388,799 A | * | 6/1983 | Vives ....................... | 242/439.5 |
| 4,982,560 A | * | 1/1991 | Vives et al. ................. | 242/439 |
| 5,301,885 A | * | 4/1994 | Matsumoto ............. | 242/447.1 |
| 5,649,675 A | * | 7/1997 | Phelps ..................... | 242/441.2 |
| 5,897,729 A | * | 4/1999 | Bikson et al. ............... | 156/172 |
| 5,983,617 A | * | 11/1999 | Nelson et al. ................... | 57/3 |

FOREIGN PATENT DOCUMENTS

| | | |
|---|---|---|
| AU | 18277 76 A | 4/1978 |
| JP | 10-119138 A | 5/1998 |
| JP | 2002-283467 A | 10/2002 |
| JP | 2004-314550 A | 11/2004 |

OTHER PUBLICATIONS

Communication from European Patent Office dated Jun. 4, 2008 for application No. 08101630.5-2307.

* cited by examiner

*Primary Examiner*—Emmanuel M Marcelo
(74) *Attorney, Agent, or Firm*—Cermak Nakajima LLP; Tomoko Nakajima

(57) ABSTRACT

Helical winding is reliably carried out in a plurality of patterns at different angles in a short period of time. A filament winding apparatus for winding fiber bundles onto the surface of a mandrel includes a helical winding head for use in helical winding of the fiber bundles onto the mandrel. The helical winding head includes at least two guide arrays, each including a plurality of guide portions disposed along a circumferential direction of the mandrel, and a repositioning mechanism capable of repositioning the guide portions by rotating each guide array relative to another.

15 Claims, 11 Drawing Sheets

(a)

(b)

(a)

(b)

FILAMENT WINDING METHOD AND APPARATUS

BACKGROUND OF THE INVENTION

1. Field of the Invention

The present invention relates to filament winding methods and apparatuses for winding fiber bundles onto the surface of a rotating mandrel, thereby manufacturing a pressure tank or suchlike.

2. Description of the Background Art

The filament winding apparatus is an apparatus for manufacturing hollow containers, such as pressure tanks, pipes, and the like. The filament winding apparatus winds fiber bundles onto a mandrel (a liner) to manufacture a product (a pressure tank or suchlike). The fiber bundle is made up of a fiber material consisting of, for example, a glass fiber and synthetic resin.

In general, the filament winding apparatus manufactures a product by winding fiber bundles by means of both hoop winding ((a) of FIG. 3) and helical winding ((b) and (c) of FIG. 3), thereby making a plurality of layers (e.g., ten layers of more) of fiber bundles (see Japanese Laid-Open Patent Publication No. 10-119138). During the hoop winding, the fiber bundles are wound roughly perpendicular to the axial direction of the mandrel, whereas during the helical winding, the fiber bundles are wound at a predetermined angle with respect to the axial direction of the mandrel. Typically, the filament winding apparatus sequentially winds a small number of fiber bundles (e.g., ten bundles or less) onto the rotating mandrel to cover the mandrel surface with the fiber bundles.

Incidentally, in some cases, for example, to enhance product strength, the helical winding is carried out to form a plurality of layers in a plurality of patterns at different angles with respect to the axial direction of the mandrel. Conventionally, the filament winding apparatus winds a small number of fiber bundles onto the mandrel, and therefore when carrying out the helical winding in a plurality of patterns, product manufacturing takes a significant amount of time. Although the manufacturing time can be shortened by winding wider fiber bundles onto the mandrel, the wider fiber bundles slip on a mirrored portion of the mandrel, resulting in a product of inferior quality. Therefore, filament winding apparatuses that wind a layer of fiber bundles at one time during the helical winding have been proposed (see Japanese Laid-Open Patent Publication Nos. 2002-283467 and 2004-314550). Such filament winding apparatuses are capable of winding a layer of fiber bundles with a single winding operation, but they have difficulty in forming helical winding layers, such that fiber bundles in each layer are uniformly arranged in such a manner as to leave no space therebetween.

SUMMARY OF THE INVENTION

Therefore, in view of the foregoing, the problem to be solved by the present invention is to provide a filament winding apparatus capable of reliably carrying out helical winding in a plurality of patterns at different angles in a short period of time.

To solve the above problem, the present invention provides a filament winding method for use in helical winding of a plurality of fiber bundles onto a mandrel, wherein a layer of fiber bundles is wound onto the mandrel at one time during the helical winding, and an apparent number of fiber bundles to be wound is changed in accordance with a winding angle. The present invention also provides a filament winding apparatus for winding fiber bundles onto a surface of a mandrel, the apparatus comprising a helical winding head for use in helical winding of a plurality of fiber bundles onto the mandrel, wherein the helical winding head includes: at least two guide arrays, each including a plurality of guide portions disposed along a circumferential direction of the mandrel; and a repositioning mechanism capable of repositioning the guide portions by rotating each guide array relative to another.

It is preferable that the guide arrays are guide ring members extending in the circumferential direction of the mandrel, and the guide portions are guide holes made along the guide ring members.

It is preferable that the repositioning mechanism is capable of creating two interchangeable states, such that, in one state, the guide portions of the guide arrays are positioned at regular intervals in the circumferential direction of the mandrel, whereas in the other state, the guide portions are each aligned with one guide portion of the other guide in the circumferential direction of the mandrel.

It is preferable that the filament winding apparatus further comprises a hoop winding head for use in hoop winding of the fiber bundles onto the mandrel, wherein the hoop winding head includes: a bobbin for supplying the fiber bundles to the mandrel; and a mechanism for rotating the bobbin along the circumferential direction of the mandrel.

It is preferable that the filament winding apparatus further comprises a controller portion for allowing the helical winding of the fiber bundles by rotating the mandrel, as well as allowing the hoop winding of the fiber bundles by rotating the bobbin of the hoop winding head.

As described above, in the filament winding apparatus according to the present invention, the helical winding head includes the at least two guide arrays, each including a plurality of guide portions disposed along the circumferential direction of the mandrel, and the repositioning mechanism capable of repositioning the guide portions by rotating each guide array relative to another. Therefore, with the guide portions, a plurality of fiber bundles can be wound onto the mandrel at one time during the helical winding, thereby making it possible to shorten the manufacturing time. In addition, the repositioning mechanism simply repositions each guide array to a predetermined position, thereby making it possible to carry out the helical winding in a plurality of patterns at different angles. Thus, the helical winding can be readily carried out in a plurality of patterns, resulting in superior productivity.

DESCRIPTION OF THE PREFERRED EMBODIMENTS

Hereinafter, a filament winding apparatus according to the present invention will be described in detail with reference to the accompanying drawings.

Figure 1:
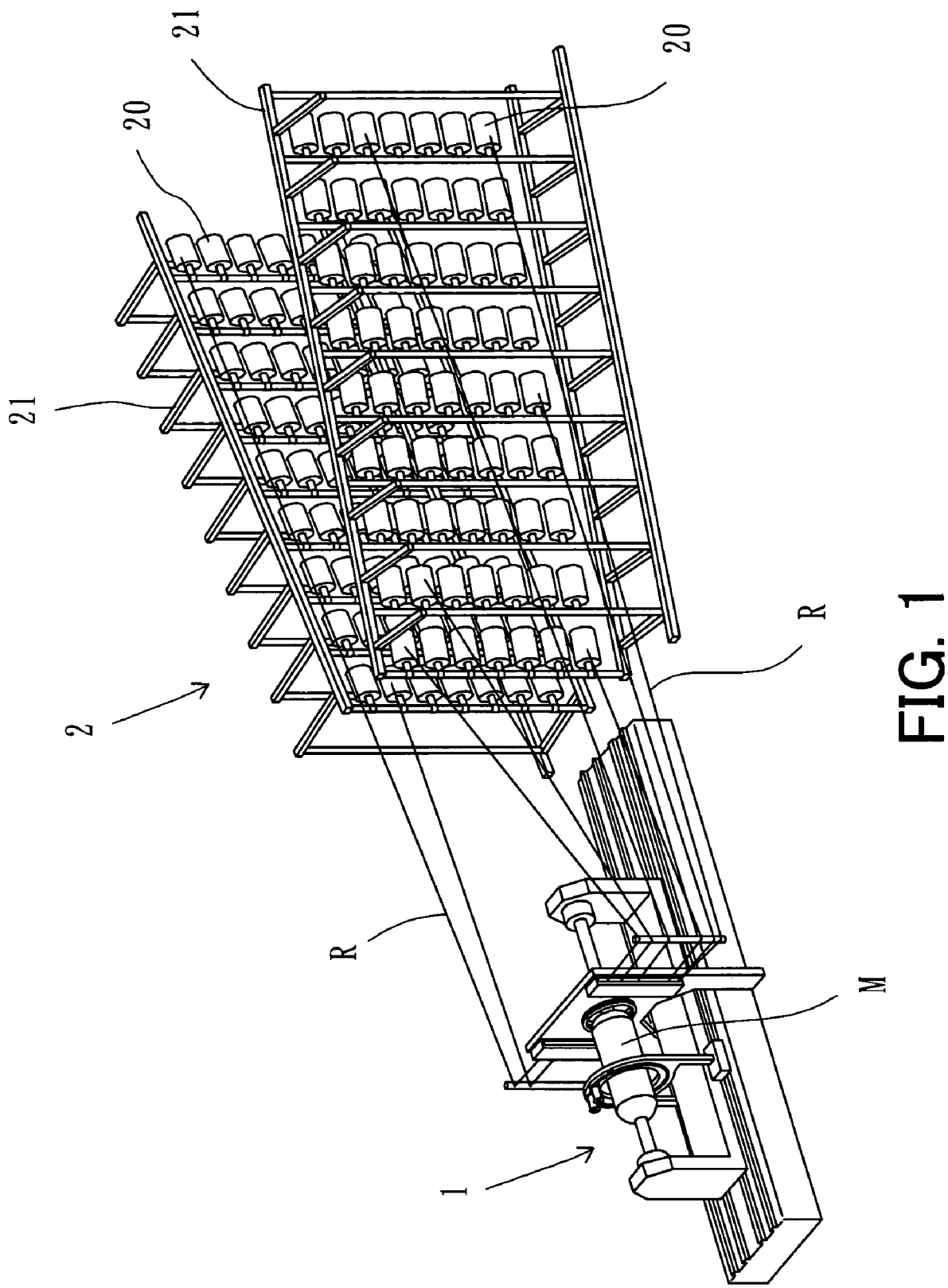
FIG. 1 is a perspective view illustrating a filament winding apparatus.
Figure 2:
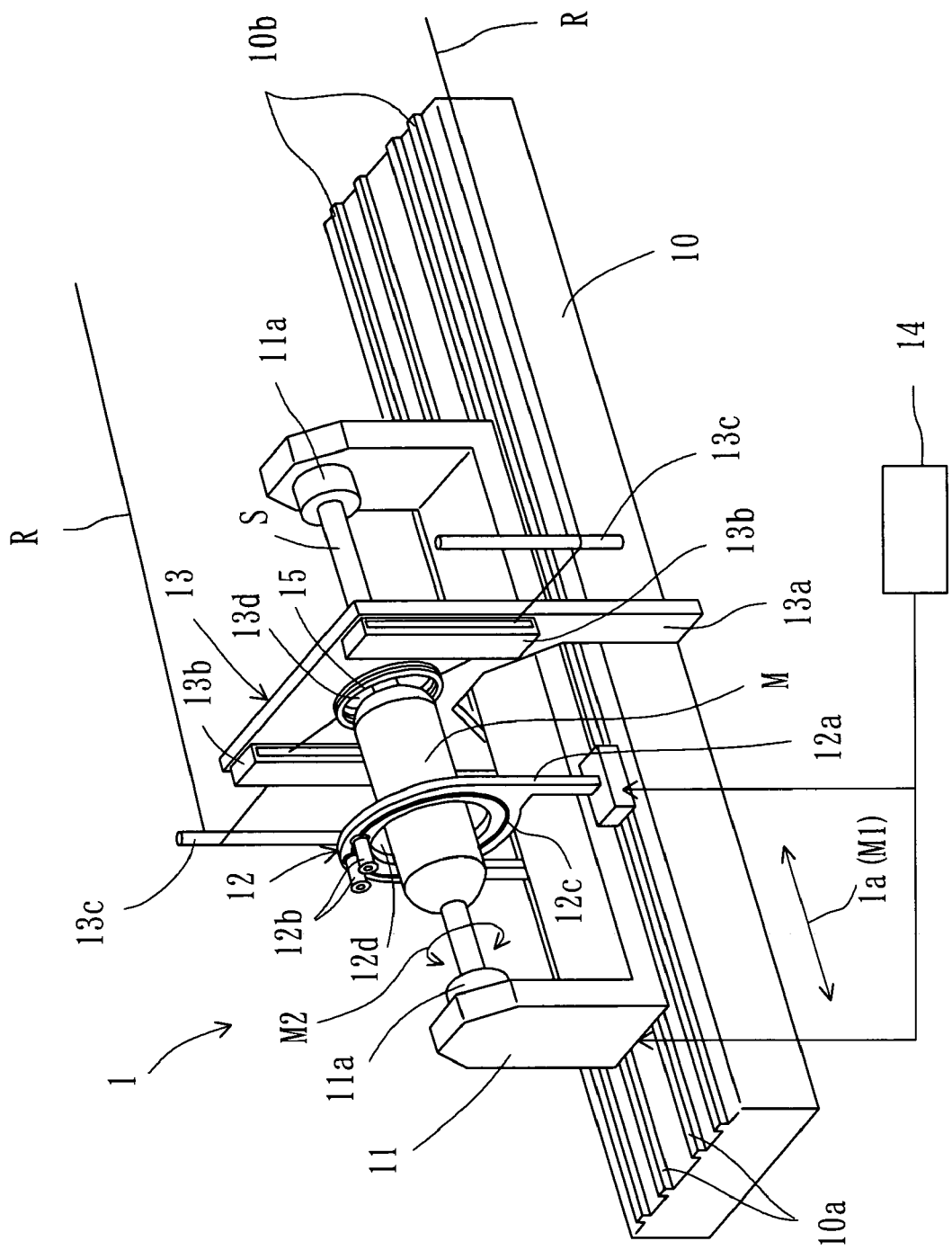
FIG. 2 is a perspective view illustrating a winder portion.

First, the structure of the filament winding apparatus will be described. FIG. 1 is a perspective view illustrating the filament winding apparatus. FIG. 2 is a perspective view illustrating a winder portion.

As shown in FIG. 1, the filament winding apparatus includes a winder portion 1, and a supplier portion 2. The winder portion 1 winds fiber bundles R onto a mandrel M. The supplier portion 2 includes creel supporters 21, each being provided with a plurality of creels 20. The creels 20 each hold a wound fiber bundle R.

The fiber bundles R are each made up of a fiber material consisting of, for example, a glass fiber and synthetic resin. The supplier portion 2 supplies the fiber bundle R unwound from each creel 20 to the winder portion 1.

The fiber bundles R have been previously impregnated with a thermosetting synthetic resin material. Note that, in some cases, the fiber bundles R are not impregnated with any resin. In such cases, a resin impregnation device (not shown) is provided between the winder portion 1 and the supplier portion 2 in order to apply resin to the fiber bundles R unwound from the creels 20 before they are supplied to the winder portion 1.

As shown in FIG. 2, the winder portion 1 includes a machine frame 10. The machine frame 10 includes a pair of parallel first guide rails 10a extending in its longitudinal direction 1a. The winder portion 1 includes a mandrel holder 11 provided on the machine frame 10. The mandrel holder 11 is capable of reciprocating along the first guide rails 10a in the longitudinal direction 1a.

The mandrel holder 11 includes a spindle S extending in the longitudinal direction 1a. The mandrel holder 11 rotatably supports the spindle S with spindle rotation shafts 11a provided at its opposite ends. The spindle rotation shafts 11a are configured to rotate the spindle S about its central axis.

Figure 3:
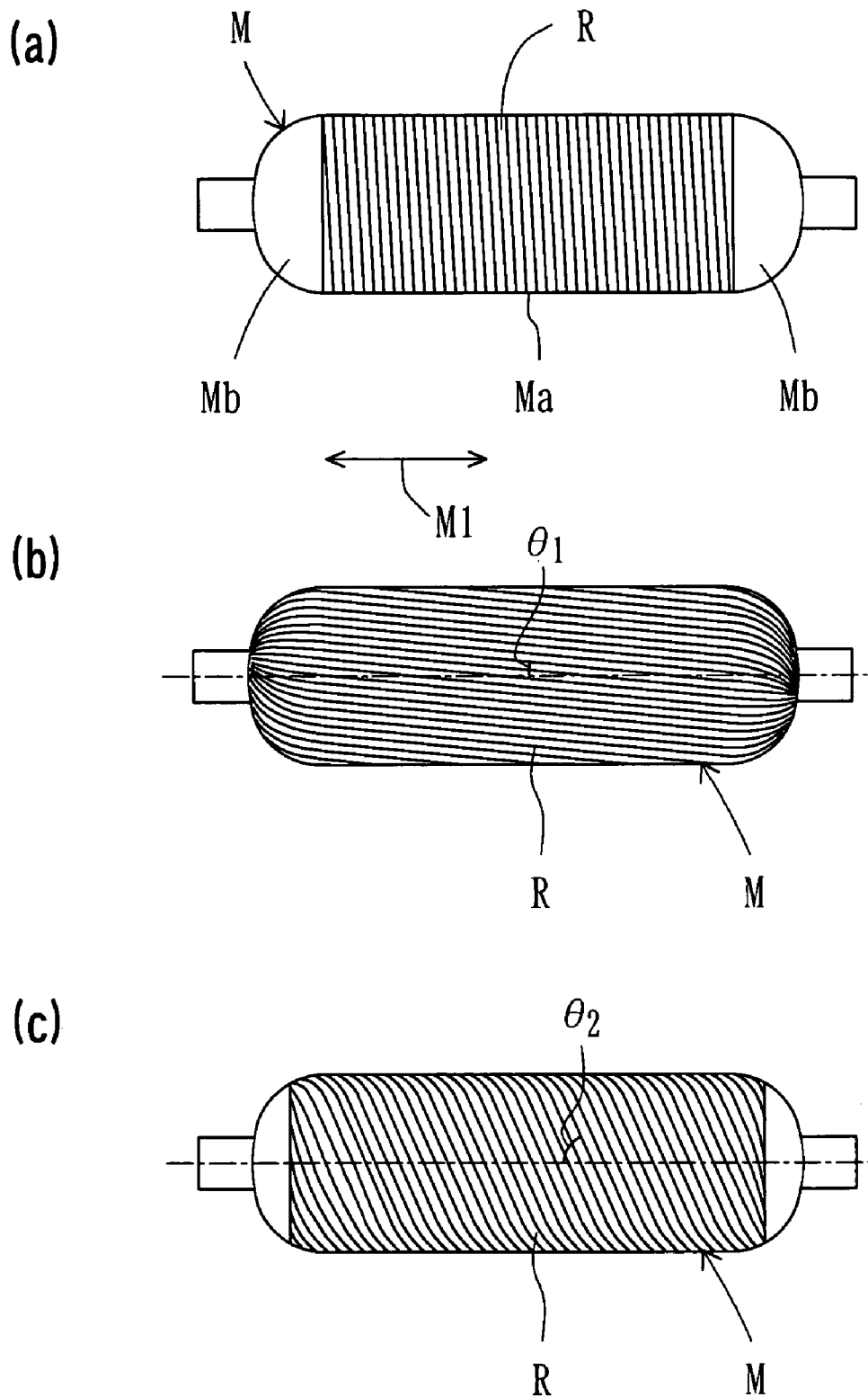
FIG. 3 is a side view illustrating a hoop winding and helical windings.

In the case of manufacturing a pressure tank, the mandrel M is made up of high-strength aluminum, metal, resin or the like, and shaped to have a cylindrical portion Ma and domed portions Mb provided at its opposite ends (FIG. 3). The spindle S removably secures the mandrel M. The mandrel M is secured to the spindle S along the central axis. Accordingly, the longitudinal direction 1a of the machine frame 10 coincides with an axial direction M1 of the mandrel M. Note that the material, shape, etc., of the mandrel M can be changed product by product.

The winder portion 1 includes a hoop winding head 12 and a helical winding head 13. The hoop winding head 12 winds the fiber bundles R onto the mandrel M by means of hoop winding. The helical winding head 13 winds the fiber bundles R onto the mandrel M by means of helical winding.

FIG. 3 is a side view illustrating a hoop winding and helical windings. During the hoop winding, the fiber bundles R are wound roughly perpendicular to the axial direction M1 of the mandrel M as shown in (a) of FIG. 3, whereas during the helical winding, the fiber bundles R are wound at a predetermined angle with respect to the axial direction M1 of the mandrel M as shown in (b) and (c) of FIG. 3.

As shown in FIG. 2, the winder portion 1 includes a controller portion 14. The controller portion 14 controls the start, stop, and speed of reciprocating movement of the mandrel holder 11, as well as the start, stop, and speed of rotation of the mandrel M via the spindle rotation shafts 11a. Furthermore, the controller portion 14 controls the start, stop, and speed of reciprocating movement of the hoop winding head 12, as well as the start, stop, and speed of circulating movement of bobbins 12b.

As shown in FIG. 2, the hoop winding head 12 includes a hoop winding head body 12a. The hoop winding head body 12a has a passage hole 12d disposed in its center. The hoop winding head 12 allows the mandrel M to pass therethrough via the passage hole 12d.

The machine frame 10 includes a pair of parallel second guide rails 10b extending in the longitudinal direction 1a. The hoop winding head body 12a is capable of reciprocating along the second guide rails 10b in the longitudinal direction 1a. Thus, the hoop winding head 12 can reciprocate in the longitudinal direction 1a of the machine frame 10, with the mandrel M passing through the passage hole 12d.

The hoop winding head 12 includes a plurality (in the present embodiment, two) of bobbins 12b for holding wound fiber bundles R. The hoop winding head body 12a has a guiding groove 12c provided outside the passage hole 12d along a circumferential direction M2 of the mandrel M. The bobbins 12b circulate along the guiding groove 12c, so that the fiber bundles R coming out of the circulating bobbins 12b are wound onto the mandrel M.

The helical winding head 13 includes a helical winding head body 13a. The helical winding head body 13a has a passage hole 13d disposed in its center. The helical winding head 13 allows the mandrel M to pass therethrough via the passage hole 13d.

The helical winding head body 13a is secured to the machine frame 10. Reciprocating movement of the mandrel holder 11 allows the helical winding head 13 to reciprocate relatively oppositely in the longitudinal direction 1a, with the mandrel M passing through the passage hole 13d.

The helical winding head 13 winds the fiber bundles R unwound from the supplier portion 2 onto the mandrel M. The helical winding head body 13a has an annular guide ring portion 15 extending around the passage hole 13d along the circumferential direction M2 of the mandrel M. The helical winding head body 13a has tension-creating members 13b opposed to each other with respect to the guide ring portion 15. The helical winding head 13 has guide rollers 13c opposed to each other with respect to the helical winding head body 13a.

With the guide rollers 13c, the helical winding head 13 guides the fiber bundles R unwound from the creels 20 to the tension devices 13b. The tension devices 13b apply predetermined tension to the fiber bundles R. The predetermined tension applied to the fiber bundles R by the tension devices 13b allows the fiber bundles R to be securely wound onto the mandrel M. The guide ring portion 15 guides the fiber bundles R to the mandrel M.

Figure 4:
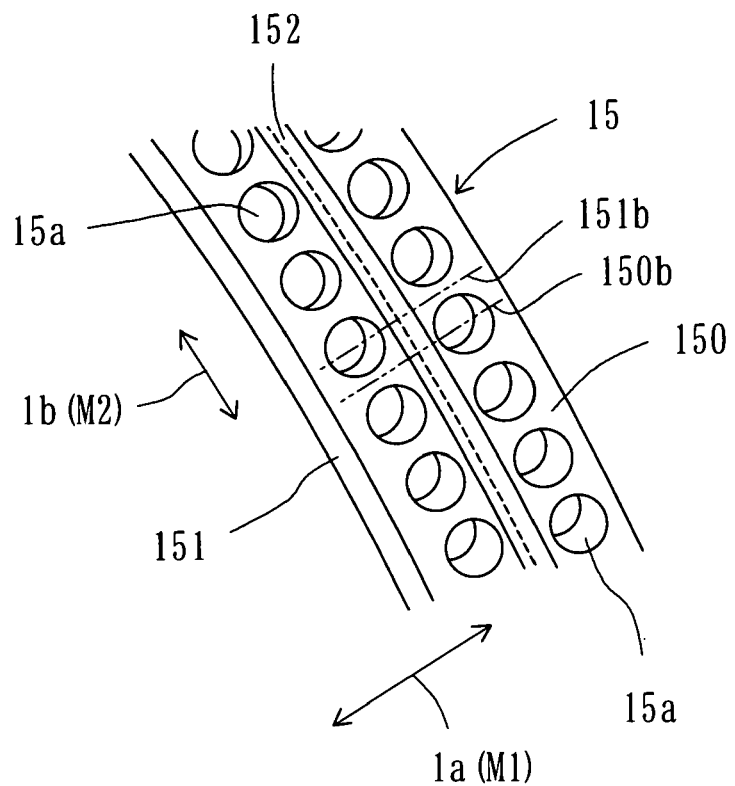
FIG. 4 is a perspective view illustrating enlarged representations of a guide ring portion.
Figure 4:
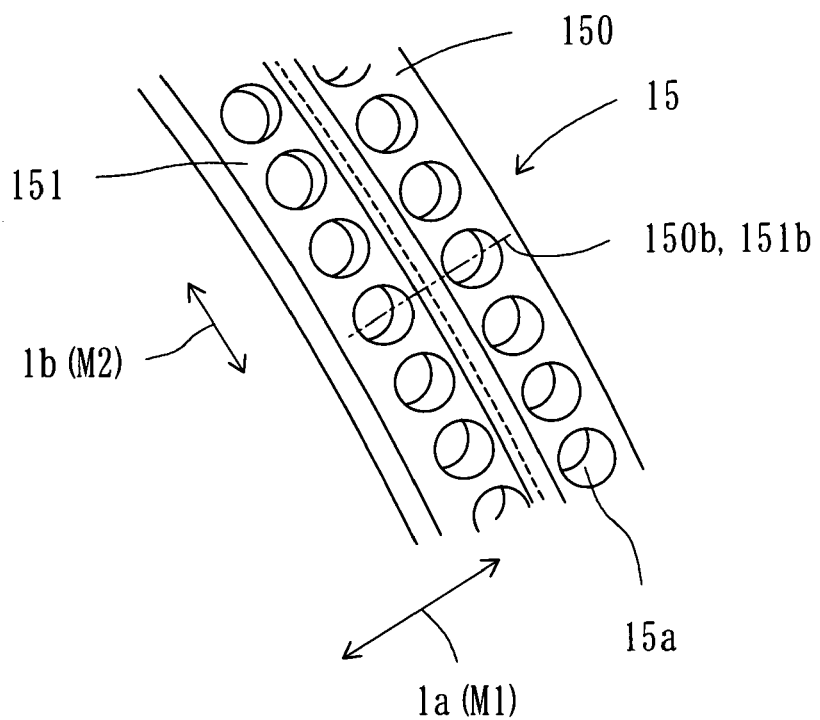

FIG. 4 is a perspective view illustrating enlarged representations of the guide ring portion. As shown in FIG. 4, the guide ring portion 15 consists of a first guide ring member 150 and a second guide ring member 151, which are shaped in the same annular form. The first guide ring member 150 and the second guide ring member 151 are in contact with each other in the longitudinal direction 1a of the machine frame 10 (the axial direction M1 of the mandrel M).

The first and second guide ring members 150 and 151 have a plurality of guide holes 15a provided along a circumferential direction 1b of the guide ring portion 15. The circumferential direction 1b of the guide ring portion 15 coincides with the circumferential direction M2 of the mandrel M.

The guide holes 15a are directed to the center of the guide ring portion 15. The guide ring portion 15 guides the fiber bundles R to the mandrel M while passing each fiber bundle R through a corresponding one of the guide holes 15a. The first and second guide ring members 150 and 151 have the same number of guide holes 15a provided at regular intervals.

Figure 5:
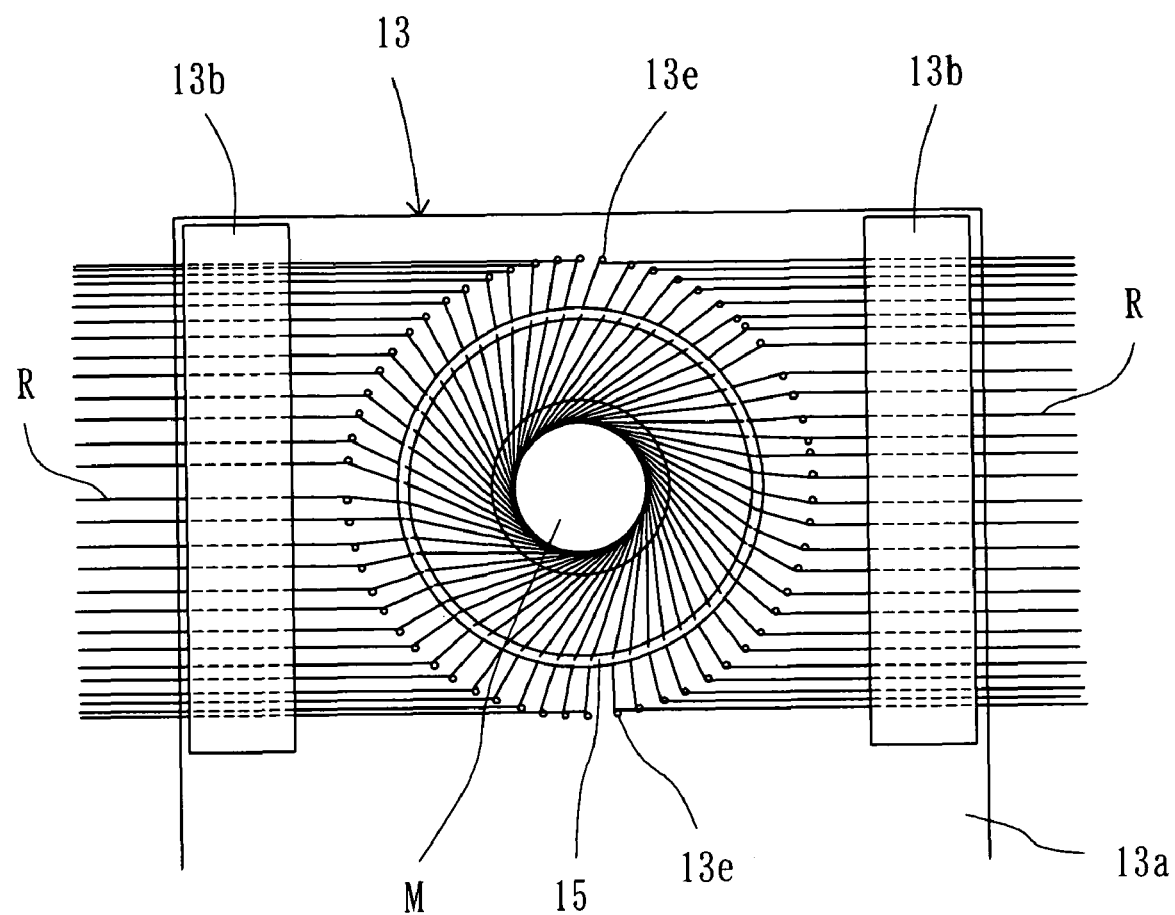
FIG. 5 is a front view illustrating a helical winding head.

FIG. 5 is a front view illustrating the helical winding head 13. As shown in FIG. 5, the helical winding head 13 includes a plurality of ring-like auxiliary guides 13e. The auxiliary guides 13e are arranged outside the guide ring portion 15 along the circumferential direction 1b of the guide ring portion 15.

The fiber bundles R unwound from the creels 20 are supplied from opposite sides of the helical winding head 13 through the guide rollers 13c to the tension devices 13b. The fiber bundles R are guided from the tension devices 13b through the auxiliary guides 13e to the guide holes 15a in the guide ring portion 15.

Figure 6:
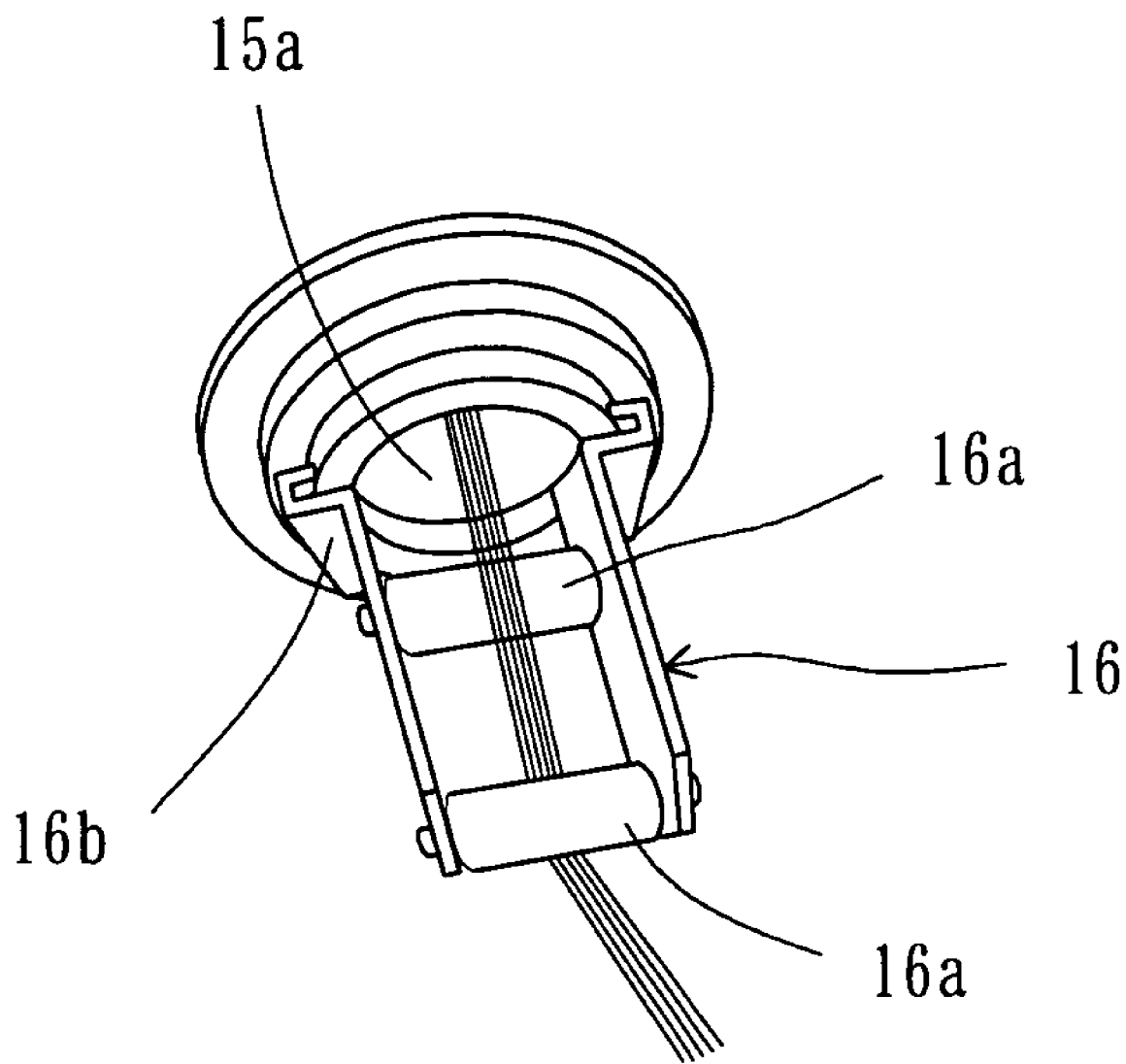
FIG. 6 is a perspective view illustrating a bundle spreading guide.

FIG. 6 is a perspective view illustrating a bundle spreading guide. As shown in FIG. 6, the guide ring portion 15 has provided on its inside the bundle spreading guide 16 per guide hole 15a. The bundle spreading guide 16 has a pair of bundle spreading rollers 16a rotatably provided thereto. The bundle spreading rollers 16a are provided in parallel to each other in the diametrical direction of the guide hole 15a. The bundle spreading guide 16 includes a rotating base 16b capable of rotating about the center of the guide hole 15a. The rotating base 16b supports the bundle spreading rollers 16a.

The bundle spreading guide 16 is configured to pass the fiber bundle R between the pair of bundle spreading rollers 16a. Therefore, even if the angle is changed at which to wind the fiber bundle R onto the mandrel M, the bundle spreading guide 16 can rotate to freely change its direction to wind the fiber bundle R onto the mandrel M, with the fiber bundle R being spread by the bundle spreading rollers 16a (i.e., the width of the fiber bundle becomes wider).

Figure 7:
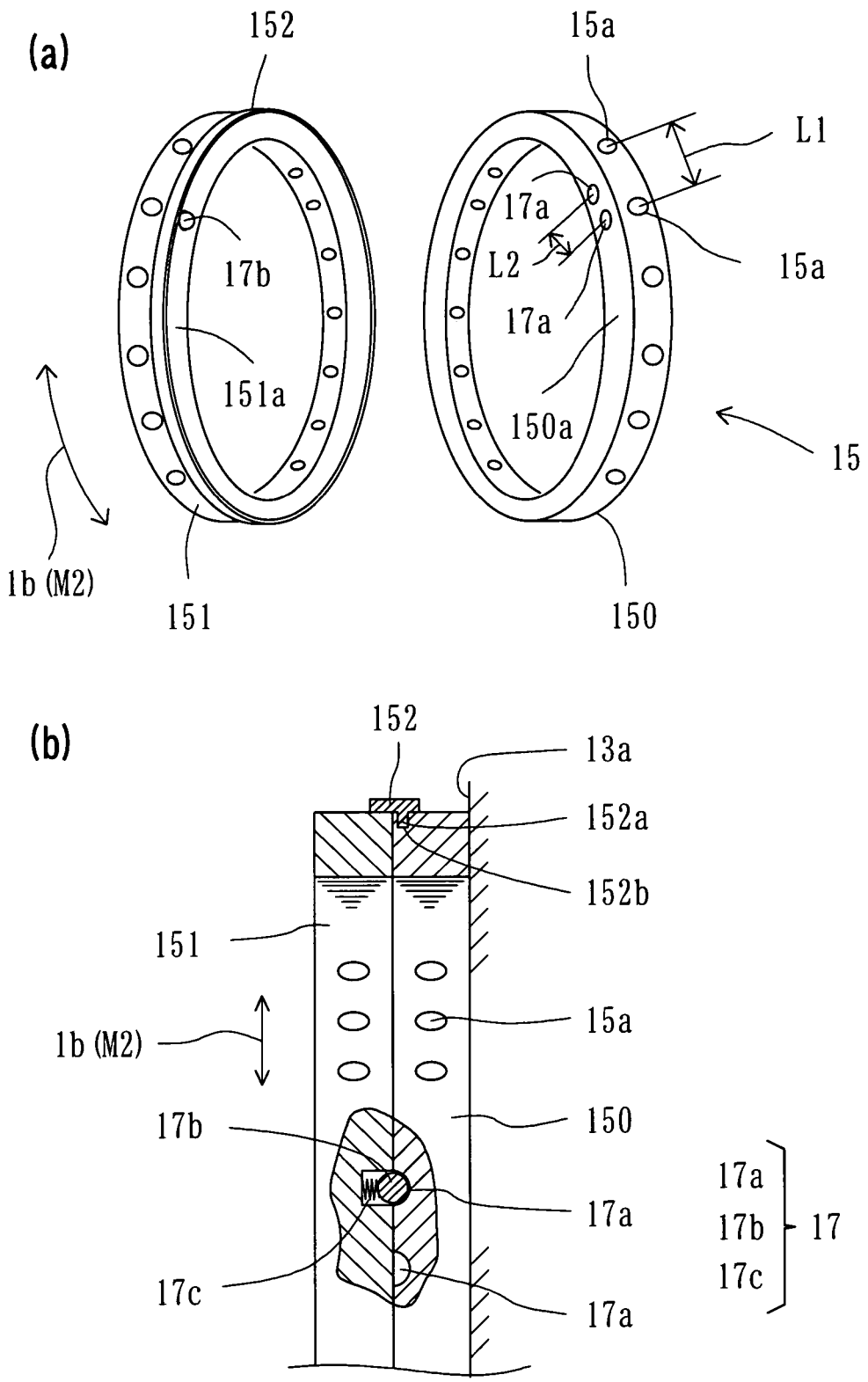
FIG. 7 is a diagram for describing a repositioning mechanism, in which (a) is an exploded perspective view of the guide ring portion, and (b) is a cross-sectional side view of a portion of the guide ring portion.

FIG. 7 is a diagram for describing a repositioning mechanism, in which (a) is an exploded perspective view of the guide ring portion, and (b) is a cross-sectional side view of a portion of the guide ring portion. As shown in FIG. 7, the guide ring portion 15 has a connection ring 152 provided around its outer circumference, such that the connection ring 152 is disposed on both the first and second guide ring members 150 and 151 to connect them together.

The connection ring 152 is secured to the second guide ring member 151. The connection ring 152 extends along the circumferential direction 1b of the guide ring portion 15 ((a) of FIG. 7), and has a rail portion 152a protruding toward the inside of the first guide ring member 150 ((b) of FIG. 7). The first guide ring member 150 has a guiding groove 152b externally provided along the circumferential direction 1b ((b) of FIG. 7).

The first guide ring member 150 is secured to the helical winding head body 13a. The rail portion 152a of the connection ring 152 firmly attached to the second guide ring member 151 engages the guiding groove 152b provided in the first guide ring member 150. As a result, the second guide ring member 151 rotationally slides in the circumferential direction 1b with respect to the first guide ring member 150.

The guide ring portion 15 includes a repositioning mechanism 17. The repositioning mechanism 17 allows the second guide ring member 151 to rotate by a predetermined angle with respect to the first guide ring member 150. The repositioning mechanism 17 has two semispherical concave recesses 17a provided in a contact surface 150a of the first guide ring member 150 that is in contact with the second guide ring member 151.

Furthermore, the repositioning mechanism 17 has a ball 17b provided in a contact face 151a of the second guide ring member 151 that is in contact with the first guide ring member 150, and the ball 17b can be fitted in the recesses 17a. The ball 17b can emerge from/recoil into the contact face 151a of the second guide ring member 151 in accordance with expansion/contraction of a compression spring 17c.

When the compression spring 17c contracts, the ball 17b recoils to allow rotation of the second guide ring member 151. On the other hand, when the compression spring 17c expands, the ball 17b engages one of the recesses 17a, so that the second guide ring member 151 is fixed in one of two shift positions, thereby allowing the guide ring portion 15 to shift between first and second states.

The distance L2 between the recesses 17a is half the distance L1 between two adjacent guide holes 15a ((a) of FIG. 7). When the guide ring portion 15 is in the first state, each guide hole 15a in the second guide ring member 151 faces an intermediary position between two adjacent guide holes 15a in the first guide ring member 150 as shown in (a) of FIG. 4. Specifically, in the circumferential direction 1b, each center line 150b, which theoretically extends in the diametrical direction 1a of its one corresponding guide hole 15a in the first guide ring member 150 (the diametrical direction being identical to the longitudinal direction 1a), is equally distanced from two adjacent center lines 151b, each theoretically extending in the diametrical direction 1a of its one corresponding guide hole 15a in the second guide ring member 151.

Furthermore, when the guide ring portion 15 is in the second state, each guide hole 15a of the first guide ring member 150 is aligned with one of the guide holes 15a in the second guide ring member 151 as shown in (b) of FIG. 4. Specifically, in the circumferential direction 1b, each center line 150b, which theoretically extends in the diametrical direction 1a of its one corresponding guide hole 15a in the first guide ring member 150, overlaps with one of the center lines 151b, each theoretically extending in the diametrical direction 1a of its one corresponding guide hole 15a in the second guide ring member 151.

Figure 8:
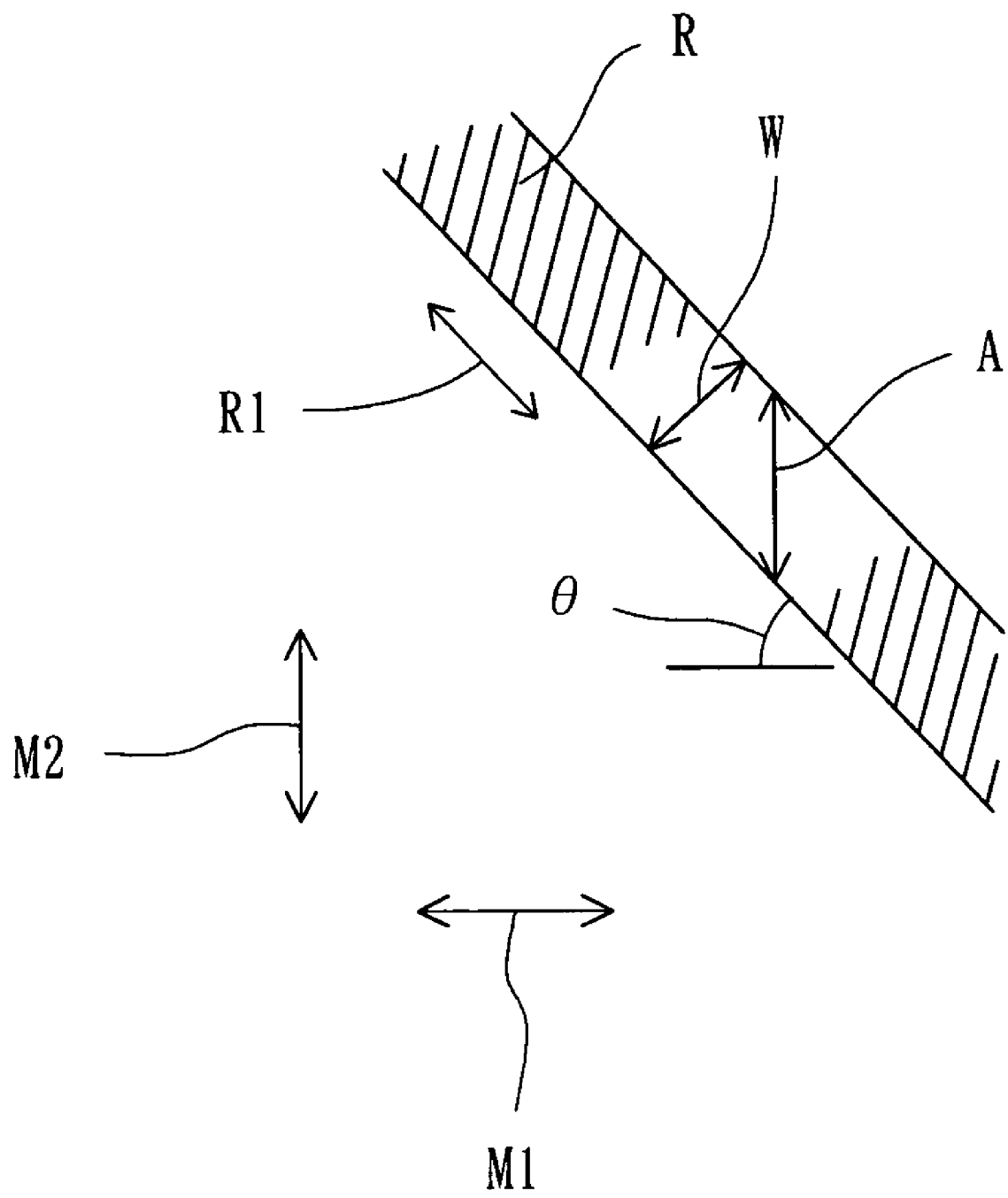
FIG. 8 is an enlarged side view illustrating a fiber bundle R wound by means of helical winding.

FIG. 8 is an enlarged side view illustrating a fiber bundle R wound by means of helical winding. As shown in FIG. 8, the fiber bundle R wound by means of helical winding is inclined at a predetermined angle (winding angle) of $\theta$ with respect to the axial direction M1 of the mandrel M. The winding angle of $\theta$ can be changed variously in accordance with, for example, mechanical strength required by the product.

Here, for each fiber bundle R, if the dimension (width) in the direction perpendicular to a length direction R1 is W, the dimension (perimeter section) in the circumferential direction M2 of the mandrel M is A, and the winding angle is $\theta$, the following equation (1) is established.

$$A = W/\cos\theta \tag{1}$$

For the mandrel M, if the radius is r, and the dimension (entire perimeter) in the circumferential direction M2 is B, the following equation (2) is established.

$$B = 2\pi r \tag{2}$$

Accordingly, in the case of covering the mandrel M with one layer of fiber bundles R, if the number of fiber bundles R that are to be arranged in parallel to each other without any overlap (and space) in the circumferential direction M2 of the mandrel M is n, the following equation (3) can be established in accordance with the above equations (1) and (2).

$$n=B/A=(2\pi r \cdot \cos \theta)/W \quad (3)$$

Figure 10:
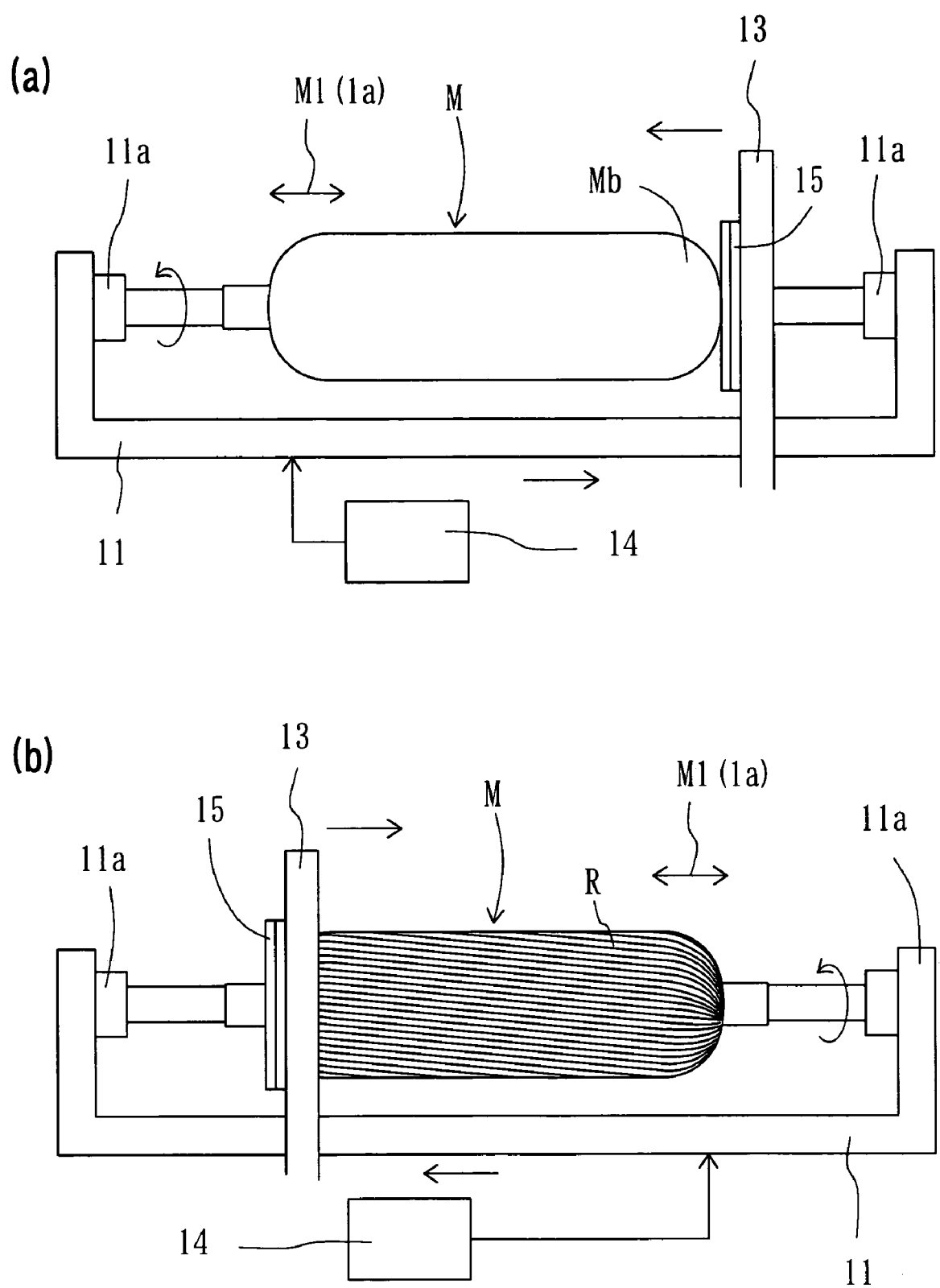
FIG. 10 is a side view illustrating the winding operation of the filament winding apparatus during helical winding (with a winding angle of θ1).

The helical winding head 13 is capable of covering the entire perimeter of the mandrel M with the fiber bundles R at one time. Here, the term "one time" refers to a single operation in which the head 13 traverses the mandrel M from one end to the other as shown in FIG. 10. In addition, the helical winding head 13 is capable of carrying out the helical winding in two patterns respectively at winding angles of θ1 ((b) of FIG. 3) and θ2 (>θ1) ((c) of FIG. 3).

According to the above equation (3), when the winding angle is θ1, the number of fiber bundles R that are to be arranged in parallel to each other without any overlap (and space) in the circumferential direction M2 of the mandrel M is n1=(2πr·cos θ1)/W. In addition, when the winding angle is θ2, the number of fiber bundles R is n2=(2πr·cos θ2)/W. Note that the relationship between the above winding angles is such that θ1<θ2, and therefore the relationship between the above numbers of fiber bundles R is such that n1>n2.

The guide ring portion 15 is configured as described below, such that the helical winding is carried out with the winding angle of θ1 in the first state or with the winding angle of θ2 in the second state.

The relationship between the numbers of fiber bundles R during the helical winding is such that n2×2=n1. That is, the winding angles of θ1 and θ2 are set such that the relationship n2×2=n1 is established. Moreover, the first and second guide ring members 150 and 151 each have n2 guide holes 15a arranged at regular intervals.

Accordingly, by bringing the guide ring portion 15 into the first state, each guide hole 15a in the guide ring member 150 is equally displaced from its one corresponding guide hole 15a in the guide ring member 151 ((a) of FIG. 4), and therefore n2×2 (=n1) guide holes 15a are considered to be arranged in the circumferential direction M2 of the mandrel M.

In addition, by bringing the guide ring portion 15 back into the second state, each guide hole 15a in the guide ring member 150 is aligned with one of the guide holes 15a in the guide ring member 151 ((b) of FIG. 4), and therefore n2 pairs (sets) of aligned guide holes 15a are considered to be arranged in the circumferential direction of the mandrel M.

Therefore, in theory, when the guide ring portion 15 is in the first state, there are n2×2 (=n1) guide holes 15a arranged in the circumferential direction M2 of the mandrel M, whereas when the guide ring portion 15 is in the second state, there are n2 pairs of aligned guide holes 15a arranged in the circumferential direction M2 of the mandrel M.

Thus, by bringing the guide ring portion 15 into the first state, n2×2 (=n1) fiber bundles R are wound onto the mandrel M at one time, thereby achieving the helical winding with the winding angle of θ1. Furthermore, by bringing the guide ring portion 15 into the second state, n2 pairs (sets) of fiber bundles R are wound onto the mandrel M at one time, such that the fiber bundles R in each pair are stuck together (to form two layers), thereby achieving the helical winding with the winding angle of θ2.

Figure 9:
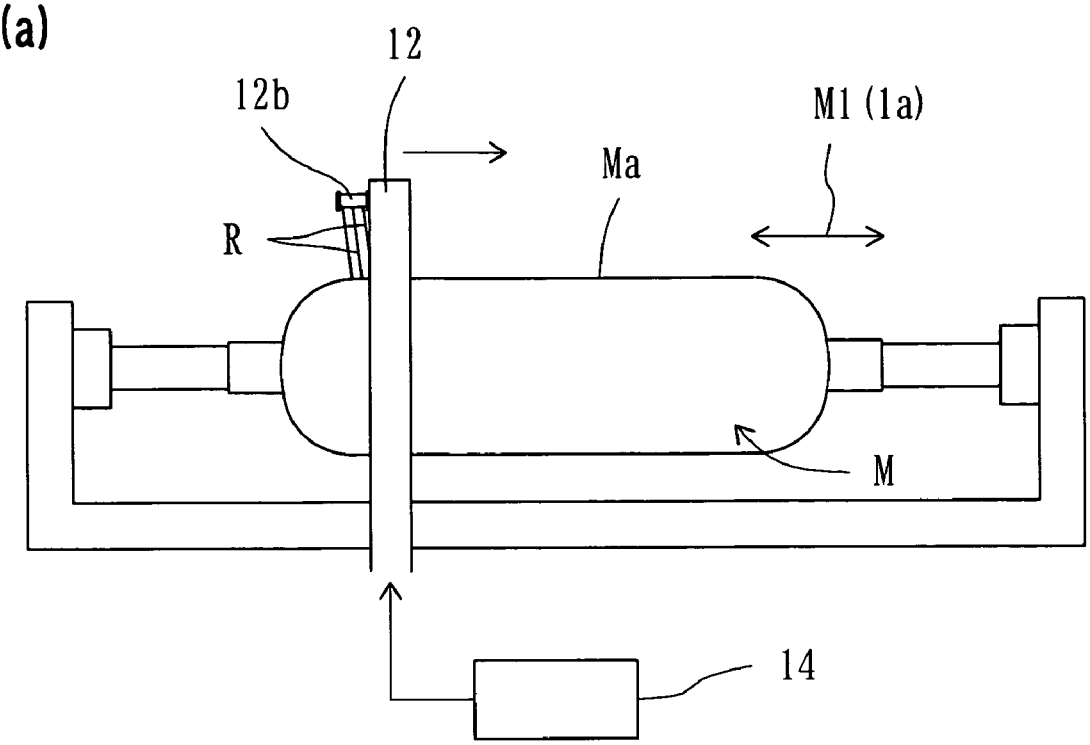
FIG. 9 is a side view illustrating the winding operation of the filament winding apparatus during hoop winding.
Figure 9:
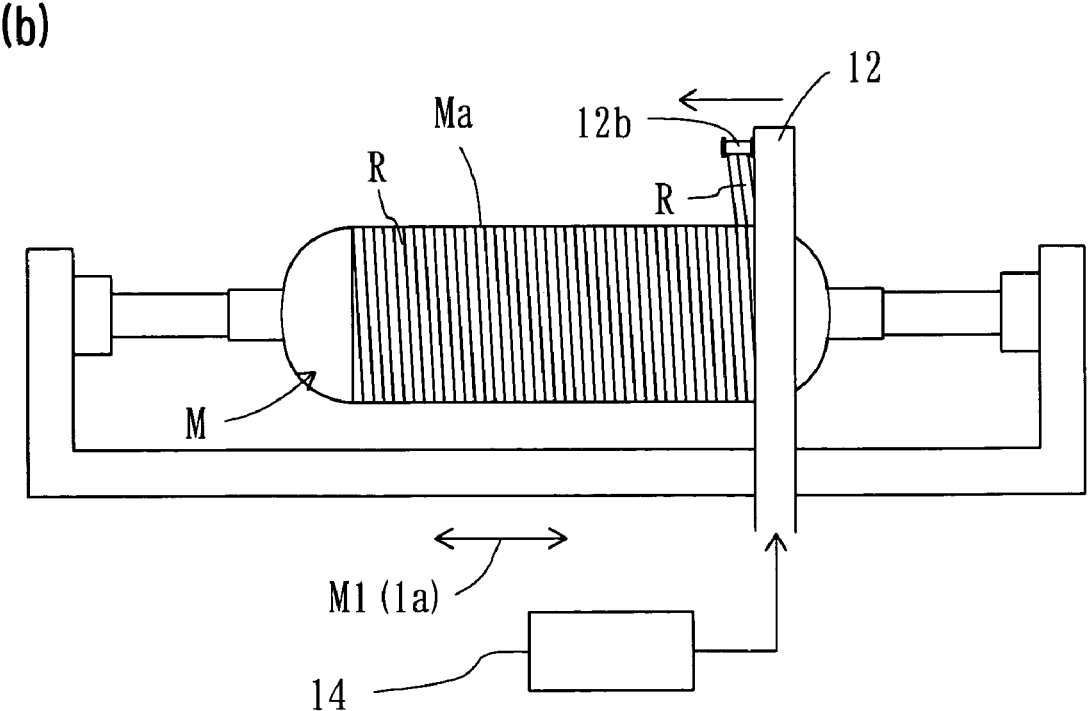

Described next are winding operations of the filament winding apparatus. FIG. 9 is a side view illustrating the winding operation of the filament winding apparatus during hoop winding. During the hoop winding, the hoop winding head 12 is controlled by the controller portion 14 as described below, so as to operate as shown in FIG. 9.

First, the hoop winding head 12 is positioned at one end (left side in the figure; hereinafter referred to as the "left end") of the cylindrical portion Ma of the mandrel M ((a) of FIG. 9). Thereafter, two fiber bundles R unwound from their respective bobbins 12b are attached to the left end of the cylindrical portion Ma with adhesive tape or suchlike. At this time, the two fiber bundles R are arranged in parallel to each other without leaving any space therebetween in the axial direction M1 of the mandrel M.

Thereafter, the hoop winding head 12 moves toward the other end (right side in the figure; hereinafter, referred to as the "right end") of the cylindrical portion Ma, while circulating the bobbins 12b. As a result, the two fiber bundles R are further drawn out of the bobbins 12b. The two fiber bundles R are roughly perpendicular to (slightly inclined from) the axial direction M1 of the mandrel M, and they are arranged in parallel to each other without any overlap and space therebetween. To achieve such an arrangement, the moving speed of the hoop winding head 12 and the circulating speed of the bobbins 12b are suitably determined.

By moving the hoop winding head 12 from the left end of the cylindrical portion Ma ((a) of FIG. 9) to the right end ((b) of FIG. 9), one layer of fiber bundles R is formed on the cylindrical portion Ma. Subsequently, the hoop winding head 12 moves from the right end ((b) of FIG. 9) to the left end ((a) of FIG. 9).

One reciprocation of the hoop winding head 12 results in two layers of fiber bundles R formed on the cylindrical portion Ma. To carry out further winding, the above-described operation is repeated a predetermined number of times. Thereafter, the fiber bundles R are cut by cutting means (not shown), thereby completing the hoop winding.

FIG. 10 is a side view illustrating the winding operation of the filament winding apparatus during helical winding (with the winding angle of θ1). During the helical winding (with the winding angle of θ1), the mandrel holder 11 is controlled by the controller portion 14 as described below, so as to operate as shown in FIG. 10.

First, the helical winding head 13 is positioned at the other end (right side in the figure; hereinafter, referred to as the "right end") of the mandrel M, i.e., the end of the right-side domed portion Mb in the figure, ((a) of FIG. 10). Thereafter, the guide ring portion 15 of the helical winding head 13 is brought into the first state. In the first state, n2×2 (=n1) guide holes 15a are arranged at regular intervals in the guide ring portion 15 as described above.

Thereafter, n1 fiber bundles R drawn out of the guide holes 15a are attached with adhesive tape or suchlike to the right end of the mandrel M in the circumferential direction M2 of the mandrel M. Subsequently, the mandrel holder 11 moves, so that the helical winding head 13 moves relatively in the opposite direction, from the right end of the mandrel M ((a) of FIG. 10) to the other end (left side in the figure; hereinafter, referred to as the "left end") ((b) of FIG. 10). Simultaneously with this movement, the mandrel M is rotated via the spindle rotation shafts 11a.

The n1 fiber bundles R are wound at the winding angle of θ1 with respect to the axial direction M1 of the mandrel M, such that they are arranged in parallel to each other without any overlap and space therebetween. To achieve such an arrangement, the moving speed of the helical winding head 13 (the mandrel holder 11) and the rotating speed of the mandrel M (the spindle rotation shafts 11a) are suitably determined.

By moving the helical winding head 13 from the right end ((a) of FIG. 10) to the left end ((b) of FIG. 10), one layer of fiber bundles R is formed on the mandrel M.

Subsequently, the helical winding head 13 moves from the left end ((b) of FIG. 10) to the right end ((a) of FIG. 10). One reciprocation of the helical winding head 13 results in two layers of fiber bundles R formed on the mandrel M. To carry out further winding, the above-described operation is repeated a predetermined number of times.

Thereafter, the fiber bundles R are cut by cutting means (not shown), thereby completing the helical winding. However, in the case of subsequently carrying out helical winding with the winding angle of θ2 or hoop winding, the winding can be immediately carried out without cutting the fiber bundles R. Specifically, in the case of subsequently carrying out the helical winding with the winding angle of θ2, the guide ring portion 15 is brought into the second state before carrying out an operation as described below. Alternatively, in the case of subsequently carrying out the hoop winding, the hoop winding head 12 is activated, with the helical winding head 13 being positioned at the right end of the mandrel M.

Figure 11:
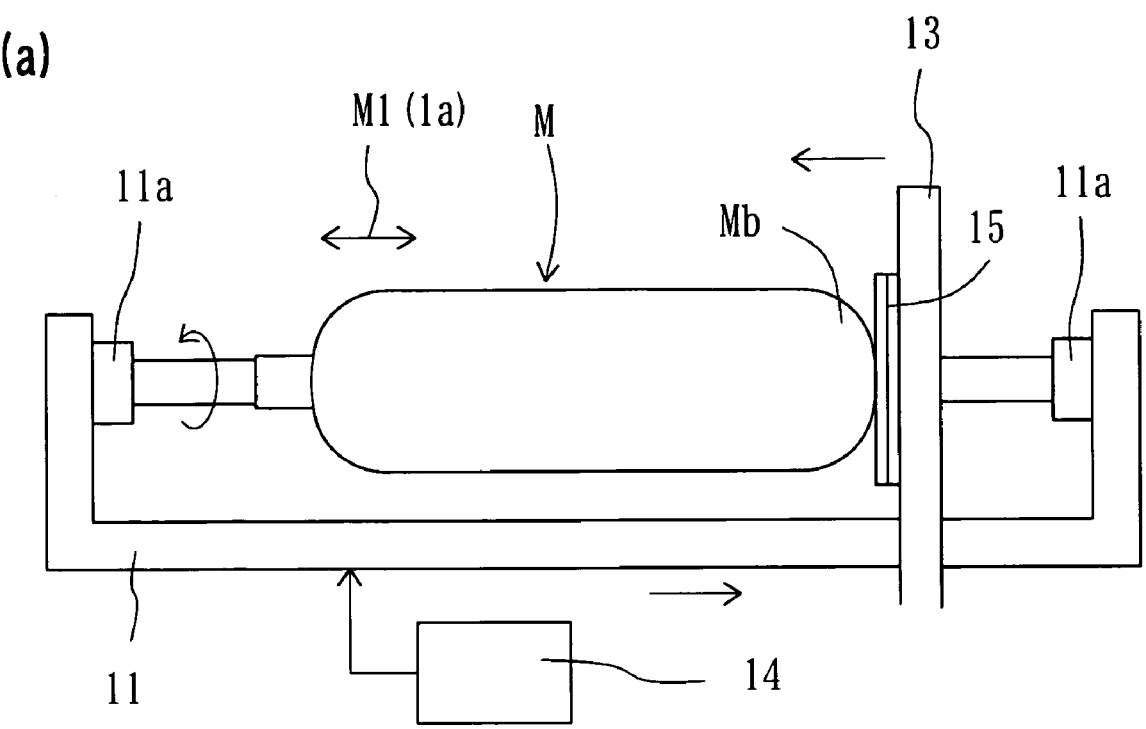
FIG. 11 is a side view illustrating the winding operation of the filament winding apparatus during the helical winding (with a winding angle of θ2).
Figure 11:
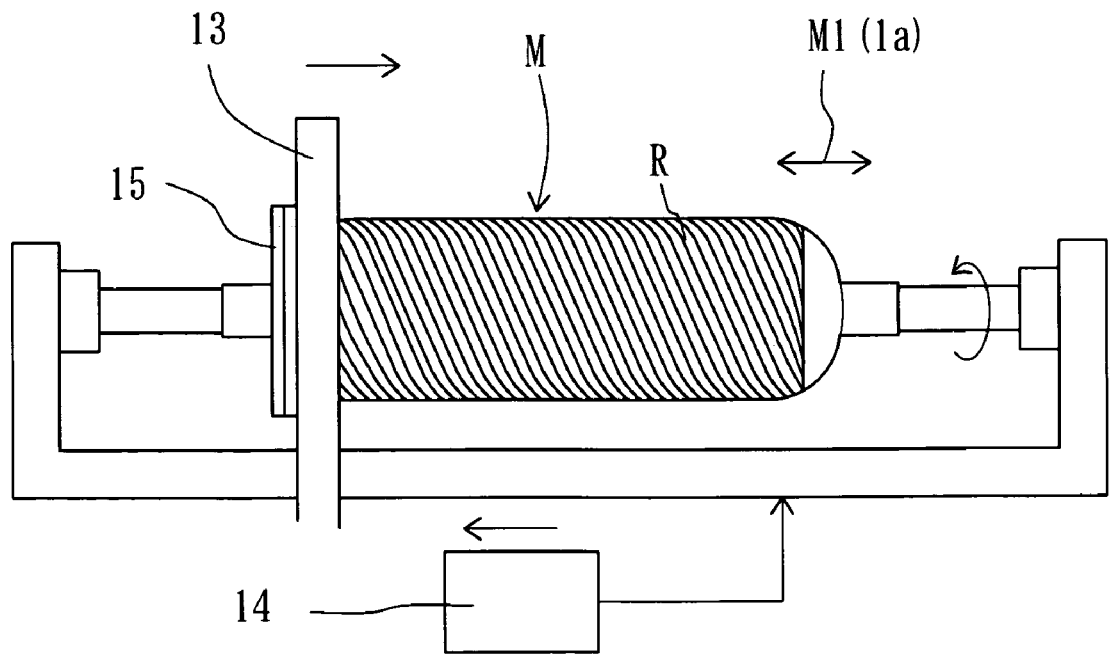

FIG. 11 is a side view illustrating the winding operation of the filament winding apparatus during the helical winding (with the winding angle of θ2). During the helical winding (with the winding angle of θ2), the mandrel holder 11 is controlled by the controller portion 14 as described below, so as to operate as shown in FIG. 11.

First, the helical winding head 13 is positioned at one end (right side in the figure; hereinafter, referred to as the "right end") of the mandrel M, i.e., the end of the right-side domed portion Mb in the figure, ((a) of FIG. 11). Thereafter, the guide ring portion 15 of the helical winding head 13 is brought into the second state. In the second state, n2 pairs (sets) of guide holes 15a are arranged at regular intervals in the guide ring portion 15 as described above.

In this case, n2 pairs of fiber bundles R are unwound from the guide holes 15a (where n2 denotes the number of pairs of fiber bundles R stuck together as described above, and the number of fiber bundles R is n2×2=n1). The n2 pairs of fiber bundles R are then adhered with adhesive tape or suchlike to the right end in the circumferential direction M2 of the mandrel M. Thereafter, the mandrel holder 11 moves, so that the helical winding head 13 moves relatively in the opposite direction, from the right end ((a) of FIG. 11) to the other end (left side in the figure; hereinafter, referred to as the "left end") ((b) of FIG. 11). Simultaneously with this movement, the mandrel M is rotated via the spindle rotation shafts 11a.

The n2 pairs of fiber bundles R are wound in parallel to each other at the winding angle of θ2 with respect to the axial direction M1 of the mandrel M, without any overlap and space therebetween. To achieve such an arrangement, the moving speed of the helical winding head 13 (the mandrel holder 11) and the rotating speed of the mandrel M (the spindle rotation shafts 11a) are suitably determined.

By moving the helical winding head 13 from the right end ((a) of FIG. 11) to the left end ((b) of FIG. 11), two layers of fiber bundles R are formed on the mandrel M. Specifically, the pairs of fiber bundles R, each consisting of two fiber bundles R stuck together, are wound, so that the two layers of fiber bundles R are formed at one time.

Subsequently, the helical winding head 13 moves from the left end ((b) of FIG. 11) to the right end, and stops there ((a) of FIG. 11). One reciprocation of the helical winding head 13 results in four layers (two layers×2) of fiber bundles R formed on the mandrel M. To carry out further winding, the above-described operation is repeated a predetermined number of times.

Thereafter, the fiber bundles R are cut by cutting means (not shown), thereby completing the helical winding. However, in the case of subsequently carrying out helical winding with the winding angle of θ1 or hoop winding, the winding can be carried out without cutting the fiber bundles R. Spe-cifically, in the case of subsequently carrying out the helical winding with the winding angle of θ1, the guide ring portion 15 is brought into the first state before carrying out the above-described operation. Alternatively, in the case of subsequently carrying out the hoop winding, the hoop winding head 12 is activated, with the helical winding head 13 being positioned at the right end of the mandrel M.

Note that the filament winding apparatus according to the present invention is not limited by the above embodiment, and can be configured as described below. Three or more guide ring members may be employed to carry out the helical winding in three or more patterns. Each guide array may be provided by arranging a plurality of ring-shaped guide portions. The guide portions do not have to be arranged at regular intervals. The repositioning mechanism is not limited to the above-described structure. Any mechanism can be employed so long as it can change the position of one guide array relative to another along the circumference direction of the mandrel.

What is claimed is:

1. A filament winding apparatus for winding fiber bundles onto a surface of a mandrel, the apparatus comprising a helical winding head for use in helical winding of a plurality of fiber bundles onto the mandrel, wherein the helical winding head includes:
at least two guide arrays, each including a plurality of guide portions disposed along a circumferential direction of the mandrel; and
a repositioning mechanism capable of repositioning the guide portions by rotating each guide array relative to another,
wherein the repositioning mechanism fixes one of the guide arrays relative to another one of the guide arrays after the one of the guide arrays is rotated relative to the another one of the guide arrays.

2. The filament winding apparatus according to claim 1, wherein the guide arrays are guide ring members extending in the circumferential direction of the mandrel, and the guide portions are guide holes made along the guide ring members.

3. The filament winding apparatus according to claim 2, wherein the repositioning mechanism is capable of creating two interchangeable states, such that, in one state, the guide portions of the guide arrays are positioned at regular intervals in the circumferential direction of the mandrel, whereas in the other state, the guide portions are each aligned with one guide portion of the other guide in the circumferential direction of the mandrel.

4. The filament winding apparatus according to claims 3, further comprising a hoop winding head for use in hoop winding of the fiber bundles onto the mandrel, wherein the hoop winding head includes:
a bobbin for supplying the fiber bundles to the mandrel; and
a mechanism for rotating the bobbin along the circumferential direction of the mandrel.

5. The filament winding apparatus according to claim 4, further comprising a controller portion for allowing the helical winding of the fiber bundles by rotating the mandrel, as well as allowing the hoop winding of the fiber bundles by rotating the bobbin of the hoop winding head.

6. The filament winding apparatus according to claim 2, further comprising a hoop winding head for use in hoop winding of the fiber bundles onto the mandrel, wherein the hoop winding head includes:
a bobbin for supplying the fiber bundles to the mandrel; and
a mechanism for rotating the bobbin along the circumferential direction of the mandrel.

7. The filament winding apparatus according to claim 6, further comprising a controller portion for allowing the helical winding of the fiber bundles by rotating the mandrel, as well as allowing the hoop winding of the fiber bundles by rotating the bobbin of the hoop winding head.

8. The filament winding apparatus according to claim 1, wherein the repositioning mechanism is capable of creating two interchangeable states, such that, in one state, the guide portions of the guide arrays are positioned at regular intervals in the circumferential direction of the mandrel, whereas in the other state, the guide portions are each aligned with one guide portion of the other guide in the circumferential direction of the mandrel.

9. The filament winding apparatus according to claims 8, further comprising a hoop winding head for use in hoop winding of the fiber bundles onto the mandrel, wherein the hoop winding head includes:

a bobbin for supplying the fiber bundles to the mandrel; and a mechanism for rotating the bobbin along the circumferential direction of the mandrel.

10. The filament winding apparatus according to claim 9, further comprising a controller portion for allowing the helical winding of the fiber bundles by rotating the mandrel, as well as allowing the hoop winding of the fiber bundles by rotating the bobbin of the hoop winding head.

11. The filament winding apparatus according to claim 1, further comprising a hoop winding head for use in hoop winding of the fiber bundles onto the mandrel, wherein the hoop winding head includes:

a bobbin for supplying the fiber bundles to the mandrel; and a mechanism for rotating the bobbin-along the circumferential direction of the mandrel.

12. The filament winding apparatus according to claim 11, further comprising a controller portion for allowing the helical winding of the fiber bundles by rotating the mandrel, as well as allowing the hoop winding of the fiber bundles by rotating the bobbin of the hoop winding head.

13. The filament winding apparatus according to claim 1, wherein a first one of the guide arrays abuts a second one of the guide arrays in an axial direction of the helical winding head.

14. The filament winding apparatus according to claim 1, wherein each of the guide portions open in a radial direction of the respective guide array.

15. A filament winding method for use in helical winding of a plurality of fiber bundles onto a mandrel: comprising:

positioning a first guide array relative to a second guide array;

fixing the first guide array to the second guide array;

winding fiber bundles onto the mandrel at a first helical angle;

repositioning the first guide array relative to the second guide array;

fixing the first guide array to the second guide array; and winding fiber bundles onto the mandrel at a second helical angle that is different from the first helical angle;

wherein a layer of fiber bundles is wound onto the mandrel at one time during the helical winding, and an apparent number of fiber bundles to be wound is changed in accordance with a winding angle.

* * * * *